Figure 1:
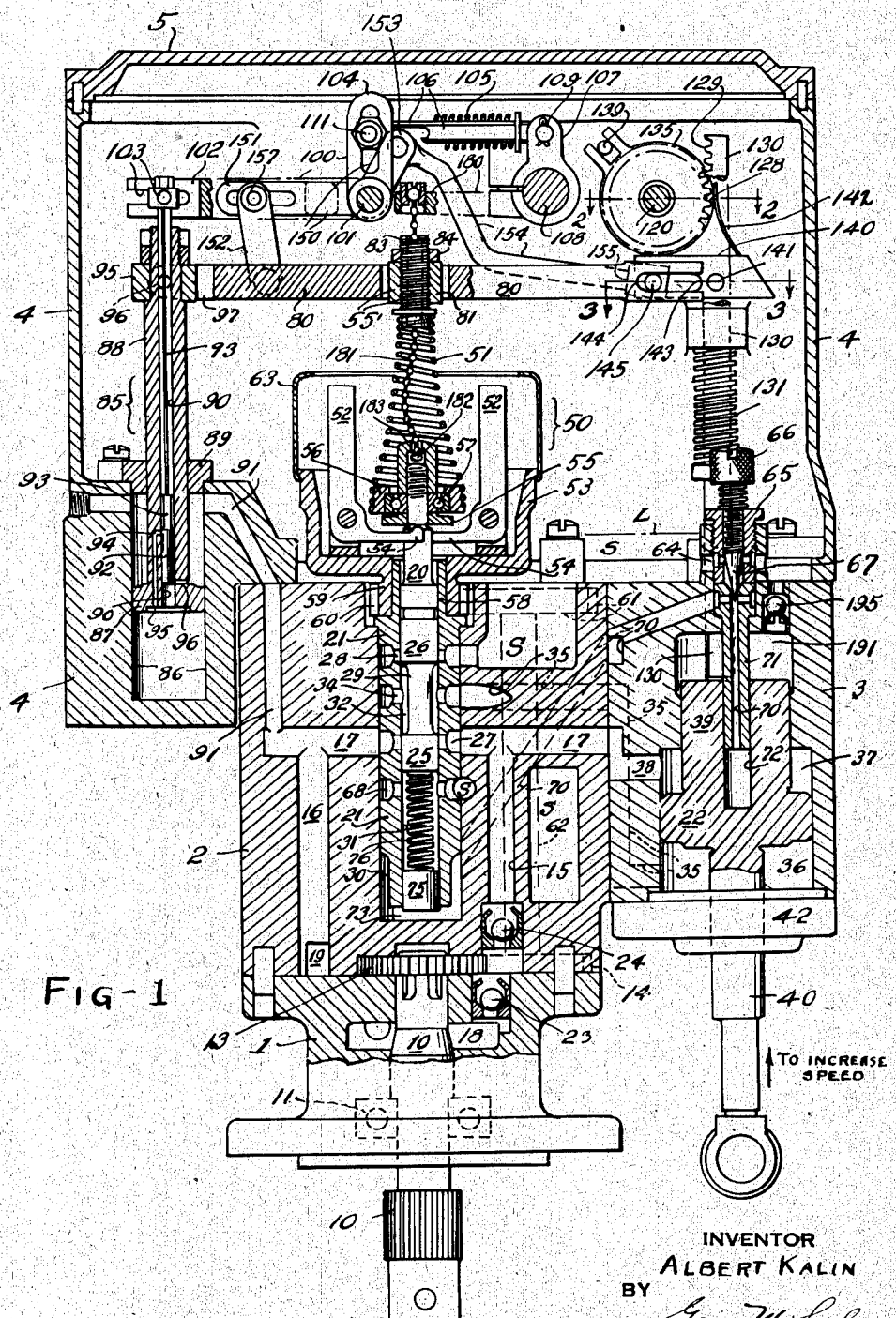

July 20, 1943.　　　　　A. KALIN　　　　　2,324,515
GOVERNOR
Filed June 2, 1941　　　　　3 Sheets-Sheet 2

INVENTOR
ALBERT KALIN
BY
*George W. Soule*
ATTORNEY

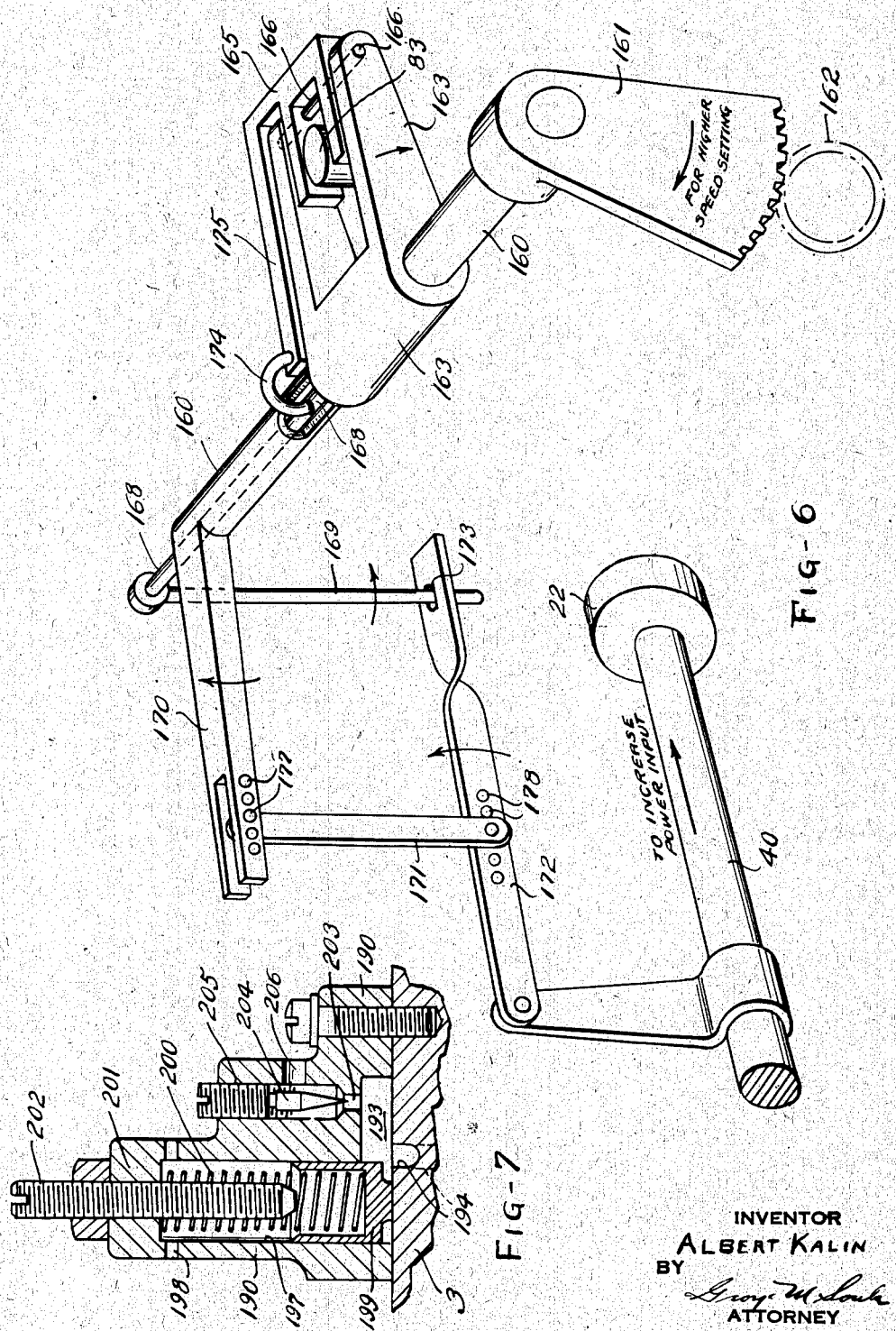

Patented July 20, 1943

2,324,515

UNITED STATES PATENT OFFICE 2,324,515

GOVERNOR

Albert Kalin, Cleveland, Ohio

Application June 2, 1941, Serial No. 396,338

21 Claims. (Cl. 264—3)

This invention relates to a governor adapted for regulating the operation (e. g. speed) of controllable apparatus and machinery in accordance with changes in conditions of operation thereof, and relates, more specifically, to a speed adjustment mechanism for a speed governor. The governor per se as illustrated herewith is adapted for controlling the speed of a prime mover such as a Diesel engine and is very similar to that shown in my Patent 2,219,229, issued October 22, 1940.

An object is generally to improve governors of the kind outlined above.

In the governing of a plurality of prime movers supplying a common load as through direct driven alternating current generators electrically in parallel by governors responsive to speed changes of the governed units, it is necessary, in order to obtain stability of operation and proper division of load that the governors allow slight decrease in speed of each unit in proportion to the increase in load. Such decrease in speed governing is commonly called speed droop. Speed droop is usually effected or obtained as a function of governor-actuated regulating operation on the units, as is well known in governing. For successful variable speed parallel operation it is necessary that the slope of the speed droop curve be decreased in proportion to decrease in speed. In other words when the speed is reduced say to one half normal the revolution per minute decrease in speed from zero load to full load should be approximately one half the speed droop at normal speed. This results in substantially constant percent speed droop from zero load to full load at any and all operating speeds. For instance, a speed droop of 10 R. P. M. at 1000 R. P. M. no load speed is 1%; but the same speed droop in R. P. M. in an engine set to run at 500 R. P. M is 2%; therefore it is necessary repeatedly to recalibrate the speed droop mechanism in order to obtain the same percentage of droop at all speeds.

One object is to provide, in combination with speed setting means and a speed droop obtaining means of a governor, a means operating as a function of change in speed setting to vary automatically the operation of the speed droop obtaining means.

Another object is to provide a mechanism enabling the speed droop characteristic of a governor to be adjusted as from zero speed droop setting (isochronous operation) to other settings in which a governed prime mover speed will depart from normal speed under load certain desired percentages of the normal speed, and wherein the percentage of departure will be automatically recalibrated in accordance with changes in speed setting over the entire range of speed settings obtainable with the governor.

A specific object is to provide for continuous retention of a constant percentage of speed droop in a governor over an entire range of speed settings of such governor.

Another object of the present invention is to provide an improved adjustable mechanism for obtaining speed droop operation of a governor.

Another object is to provide an improved control or setting arrangement for the weighing means of a governor which operates partly through hydraulic means;—special objects in this respect including: provision of improved means for adjusting a spring element of a weighing means (e. g. speeder spring of a speed responsive governor head) through the intermediary of a hydraulic motor (e. g. power head piston with appropriate control valve); provision of means enabling adjustment of such spring through a hydraulic motor for initial setting and automatically to modify the adjustment in accordance with the regulation accomplished by the governor (e. g. regulating servo-motor movement); provision for enabling yield in one direction in an operating connection between a primary adjusting means (e. g. manually or power operated speed setting shaft) and a control valve for a hydraulic power head, which valve is subject to becoming hydraulically restrained (oil locked) against free movement in said direction, and provision for enabling all the hydraulically operating mechanisms to be supplied with hydraulic fluid from a common source in a compact self-contained governor unit.

Other objects and the nature of the problems solved by the present invention will appear later herein.

Figure 2:
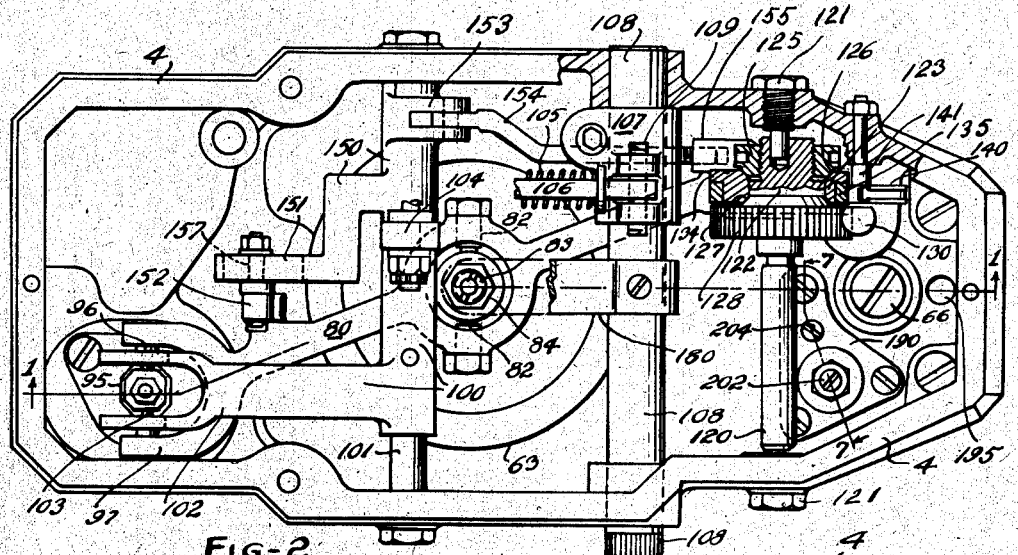
Figure 4:
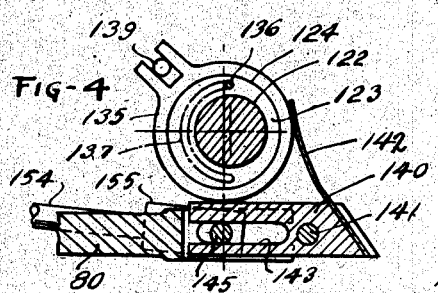
Figure 3:
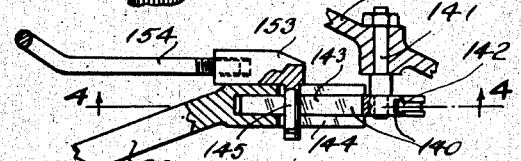
Figure 5:
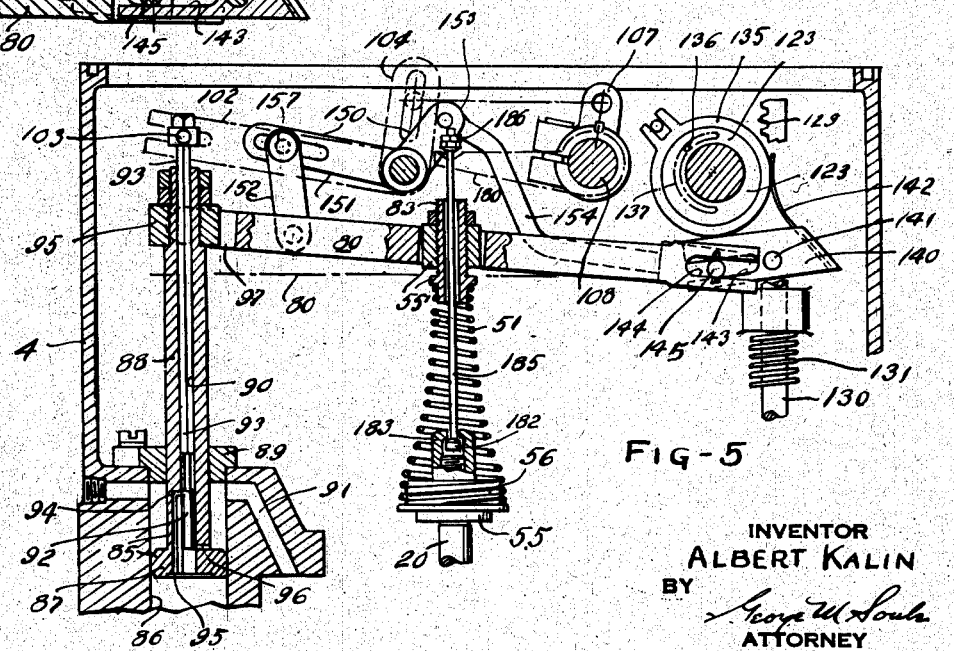

In the drawings, Fig. 1 is a generally central vertical sectional view of a governor incorporating the invention in one form (plane of section indicated on Fig. 2); Fig. 2 is a plan view of the governor (partly in section as indicated at 2—2 on Fig. 1); Figs. 3 and 4 are detail sectional views as indicated respectively at 3—3 on Fig. 1 and 4—4 on Fig. 3; Fig. 5 is a fragmentary view similar to the upper portion of Fig. 1 but with the various elements in positions different from those in which shown in Fig. 1. Fig. 6 is a schematic perspective view showing a modified mechanism for obtaining speed droop and continuously recalibrating the percentage of speed droop in accordance with different speed settings, and Fig. 7 is a sectional detail view taken as indicated at 7—7 on Fig. 2 showing the servo-check mechanism in one form.

The invention will be described only as adapted to regulate speed of a prime mover (e. g. a Diesel engine) but without intent to limit the invention to that use. The governor mechanism generally may be made responsive to any force resultant other than speed, as well known in the art.

Governor Mechanism Generally

Referring particularly to Fig. 1, 1 is a base or adapter by which the governor is mounted as on a prime mover to be governed; 2 a power case surmounting the base; 3 a main servo-motor cylinder block adjacent one side of the power case; 4 a speeder case surmounting the power case and servo-motor block, and 5 a detachable cover for the speeder case. The above parts may be metal castings suitably machined and fitted together with fluid tight joints.

For coupling the governor to a rotary part of a machine to be governed (e. g. a Diesel engine) a shaft 10 may extend into the base 1, supported as by suitable bearings 11 therein and passing through an oil seal, not shown, to the top side of the base where the shaft is suitably connected to a gear element 13 constituting one element of a gear pump.

The cooperating gear element is suggested diagrammatically as at 14 in dotted lines. The gear pump operates continuously, during rotation of the shaft 10, and cooperates with spring loaded accumulators (not shown) to maintain operating fluid at constant pressure in a system of ducts including bores 15, 16 and 17 in the power case.

Hydraulic fluid supplied to and maintained at the bore 17 under constant pressure is controlled by operation of a pilot valve (plunger 20, sleeve 21 and other elements to be described later) to effect movement of a servo-motor piston 22 in the proper direction to regulate the speed of the engine and to perform other operations as will hereinafter appear. Fluid is supplied to the pump from a supply sump S partly in the power case and partly in the speeder case, essentially in the manner shown and described in the patent identified above (Figs. 1, 2 and 4 thereof). Normal fluid level is indicated at L herein. The supply inlet of the pump (space 18, lower part of Fig. 1) communicates with the power case portion of the sump; and inlet and outlet valves (examples at 23 and 24) cooperate as usual with the pump gears, pump chambers and inlet and outlet ducts. The spring-loaded accumulators may be located in the power case at opposite sides of the bore 16 and communicate with said bore as through cross channels in the under side of the power case. One such channel is indicated at 19 (lower left, Fig. 1). The accumulators maintain uniform pressure in the ducts 15, 16 and 17, and in the event of overdelivery by the pump, excess fluid being discharged to the sump essentially as in the arrangement shown in said patent.

The pilot valve sleeve 21 is tightly fitted into a central vertical cylindrical bore 30 in a central portion of the power case which completely surrounds the valve sleeve. The valve sleeve has a cylindrical axial bore 31 which is open at both ends of the sleeve and in which main land portions 25 and 26 of the pilot valve plunger are slidably fitted and enabled to rotate while maintaining respective lateral ports 27 and 28 respectively, of the sleeve normally sealed. A necked portion 29 of the valve plunger interconnects the two lands; and the space 32 inside the valve sleeve, formed by the neck and adjacent wall of the sleeve, is constantly open to communication with a duct 35, partly in the power head casting 2 and partly in the servo-motor block 3, through lateral ports 34 in the valve sleeve. The ports 27 are always in communication with the constant pressure space 17; and the ports 28 in communication with the sump S. The ports 34, through the duct 35, supply hydraulic fluid to the space 36 below the piston 22.

The ports 27 of the sleeve which are normally blocked by the land 25 communicate freely at all times with the servo-motor cylinder space 37 above the piston 22 through a duct 38 in the servo-motor block, which duct constitutes an extension of the bore 17. The reduced trunk portion 39 of the servo-motor piston slidably closes the upper end of the servo-motor cylinder and reduces the upper effective area of the servo-motor piston relative to its lower effective area, so that, with the same pressure admitted to the cylinder above and below the piston, the latter moves upwardly. The piston has a power connection (regulating rod 40) extending downwardly out of the servo-motor cylinder block through a suitable sealing ring (not shown) in a lower cylinder closure cap 42 of said block.

Downward movement of the servo-motor piston and regulating rod reduces and eventually cuts off power input to the engine; and upward movement admits and increases such power input.

When the pilot valve plunger 20 is moved downwardly from its normal (illustrated) position, the land 25 opens the space 32 inside the valve sleeve 21 and around the neck 29 to communication with the high pressure source at the bore 17, whereupon constant pressure from the bore 17 is admitted to the duct 35 and delivered to the lower side of the servo-motor piston causing the latter to be raised due to the area differential of said piston, increasing power input to the engine.

When the pilot valve plunger is raised, the land 26, by opening the ports 28 to communication with the interior of the valve sleeve 21, dumps operating fluid from the servo-motor cylinder below the piston to the sump through the duct 35, valve sleeve space 32 and ports 28; and constant pressure from the bore 17 through the duct 38 to the upper side of the servo-motor piston then causes the latter to be lowered, reducing or cutting off power input to the engine.

The pilot valve plunger is maintained in the "balanced" position shown, holding the servo-motor piston against movement, during normal operation of the engine, by reason of the operation of a fly-ball mechanism 50 including a speeder spring 51 and fly-balls 52 pivoted on a rotary ball head 53. The inner rounded end portions of the fly-ball arms 54 bear upwardly on the lower smooth face of a thrust ring member 55 rigid with the pilot valve plunger, tending to raise the plunger as the speed of the engine increases; but (e. g.), so long as the load on the engine remains constant at a given setting of the speeder spring, the downward force of the spring on the pilot valve plunger balances the upward force imposed by the fly-balls and holds said valve plunger against vertical movement.

Friction of the ball arm fingers on the smooth lower face of thrust member 55 ordinarily causes the pilot valve plunger to rotate with the ball head during the entire operation of the governor. The spring is held against rotation at its upper end by an adjustable speeder device 55', supported as will be described later; and the lower end of the spring rests on and is connected to a thrust ring 56. An anti-friction bearing assembly 57 between the thrust ring and the pilot valve plunger enables the pilot valve plunger to turn freely notwithstanding the pressure applied by the spring.

The ball head 53 is journaled for rotation on a reduced upper end portion 58 of the pilot valve sleeve 21, a depending hub portion 59 of the ball head, which surrounds said portion 58 of the sleeve, has gear teeth 60 and, as suggested diagrammatically in Fig. 1 (dotted lines), the teeth mesh with a driving gear 61 on a vertical shaft 62 the lower end of which is drivingly rigid with the pump gear 14. The ball head 53 may be extended upwardly as by a shell 63 around the fly-balls.

Isochronous operation of the governor requires primary and secondary compensation, as is well known. The system shown herein is essentially the same as that of the above identified patent. Primary compensation is effected hydraulically as a function of servo-motor piston movement; and restrains the axial movement of the pilot valve in its operation to initiate movement of the servo-motor piston, thus preventing overtravel of said piston both in reducing and increasing power input to the engine.

For primary compensation, fluid is moved in a compensation fluid duct 70 which extends through various parts essentially the same as in my said patent. A hollow piston 71 fixed to the upper end of the servo-motor block 3 operates in an axial bore 72 of the trunk portion 139 of the servo-motor piston 22 so as to serve as an actuating compensation pump in increasing and decreasing pressure at a space 73 below the pilot valve sleeve 21 and within the closed lower end of the bore 30 of the power case. The compensation fluid duct 70 is normally kept full of operating fluid from the sump through lateral holes 64 in a sleeve 65 (above servo-motor) the bore of which sleeve has restricted communication, by reason of an adjustable needle valve 67, with the compensation fluid duct 70 at the upper end of the hollow piston 71. The holes 64 are open outwardly to the sump in the speeder case.

When load on the engine drops, the fly-balls move outwardly, thus raising the pilot valve plunger. As the pilot valve plunger is moved upwardly from its normally centered position, initiating a downward or power input reducing movement of the servo-motor piston, suction on the fluid in the compensation fluid duct 70 tends to evacuate the space 73 below the pilot valve sleeve. This acts, hydraulically, yieldingly to restrain the upward movement of the pilot valve plunger, by virtue of a receiving compensation piston 75 connected to the pilot valve plunger as by means of a coil spring 76 capable of imparting reversible restraining action on the valve plunger and capable of causing the piston 75 to turn with the valve plunger in the valve sleeve during the entire operating period of the governor. The space between the receiving compensation piston 75 and the pilot valve plunger communicates freely as through lateral ports 68 with the sump space of the power case. The restraint (primary compensation) is only temporary because, as soon as the servo-motor piston starts to move downwardly, fluid begins to leak into the compensation fluid duct (secondary compensation) from the sump at the holes 64 past the restricted communication afforded by the needle valve 67 with the compensation fluid duct. Since different engines respond to regulation at different rates, the rate of leakage of fluid just described should be adjustable. For this purpose the needle valve pin is threaded to the sleeve 65 and has for example a slotted head 66 to enable adjustment as by means of a screw driver.

Upon increase of load, resulting in a lowering movement of the pilot valve plunger, the reverse of the above described action takes place. The resulting upward or power-input - increasing movement of the servo-motor piston moves fluid in the compensation fluid duct 70, raising or tending to raise the receiving compensation piston 75, thereby to restrain the lowering movement of the pilot valve. Secondary compensation (leakage through the restriction at the needle valve 67) removes the restraining action of the compensation piston 75 on the pilot valve plunger as the speed is brought back to normal; but the direction of fluid leakage is reversed. Fluid leaks from the duct 70 into the sump.

The above described arrangement is generally the same as that of my Patent 2,219,229 and the operation thus far (isochronous governing operation) is also essentially the same as in said patent.

Speed Adjustment

The speed setting of the governor is changed by increasing or decreasing the compression of the speeder spring 51 which opposes the centrifugal force acting on the fly-balls. The illustrated mechanism for changing speed is generally the same as that disclosed in my co-pending application Serial No. 385,228, filed March 26, 1941.

As shown in Figs. 1 and 2 hereof, a speed adjusting lever 80 extends over the speeder spring 51, (diagonally of the speeder case as viewed in Fig. 2). The speeder device 55', earlier mentioned, comprises, as shown, an adjustable pivotal connection between the lever 80 and speeder spring in the form of a block 81 (cylindrical sleeve) pivoted on aligned pins 82 carried by spaced portions of the lever and a screw 83 threaded into the block and bearing downwardly on the speeder spring. The screw may be locked in place in the block as by a jamb nut 84 abutting the block. The screw adjustment compensates for slight variation in length and scale of different speeder springs, so that, in each governor, the lever may occupy substantially a single position at a given speed setting, irrespective of such variations in springs.

One end portion of the lever 80, in a governor which is always to be used to return the governed engine to a set speed irrespective of load change (isochronous), would have, in effect, a fixed pivot, and the other end portion would swing up or down to change and set the speed. Speed setting is accomplished, as in my copending application, by a vertically acting hydraulic power head 85 connected with the left hand end of the lever. The power head is controlled either by manually operated means or power driven adjusting mechanism such as a Selsyn motor.

Power head

The power head and controlling mechanism therefor may be arranged as follows:

A power head cylinder 86 is formed in the left hand lower portion of the speeder case 4. A power head piston 87 slides in the cylinder and has a hollow power rod 88 extending upwardly through a cylinder closure cap 89 having an opening which slidably receives and guides the rod 88 for vertical movement. The rod and piston have an axial bore 90 open at both ends.

An upper end portion of the cylinder is in constant communication with a suitable source of hydraulic fluid under considerable pressure, for instance with the bore 17 of the power case 2, as through a duct 91 formed partly in the power case and partly in the speeder case. The lower end of the axial bore 90 constitutes a valve sleeve in which a follow-up valve plug 92 slides. The plug has an adjusting stem 93 extending out of the top end of the piston rod bore 90. The stem for the entire length thereof within the bore 90 is formed relative to the wall of the bore 90 so as to enable hydraulic fluid to be discharged freely upwardly through the bore past the stem. The upper end of the valve plug normally is in sealing relation to a lateral port 94 in the piston (or the rod thereof as shown) which port communicates freely with the power head cylinder at the lower side of the piston, as at 95; but a slight downward movement of the stem and plug unseals said port. The lower end of the plug similarly seals a lateral port 96 which opens into the cylinder above the piston and a slight upward movement of the plug unseals the port 96. The effective transverse area of the upper side of the piston being smaller than the lower side (roughly half), the piston will be moved upwardly hydraulically whatever distance the stem 93 is raised, and will be moved downwardly whatever distance the stem 93 is lowered. Until some force is applied longitudinally on the stem the hydraulic fluid in the power head cylinder 86 locks the piston rod 88 in vertical position. When downward movement of the plug 92 uncovers the port 94 the released fluid from the power cylinder below the piston is vented along the stem 93 to the power case.

The power head piston rod 88 is pivotally attached to the speeder spring adjusting lever 80 by a collar 95 fixed to the rod and having aligned horizontal pins 96 engaging arms formed by a bifurcated portion 97 of said lever. This pivotal connection, incidentally, prevents bodily movement of the spring adjusting lever in a horizontal direction lengthwise of said lever, since the power head piston rod is substantially rigid and guided for vertical travel only.

The valve of the power head 85 (plug 92 and operating stem) requires but a small amount of power to operate it, and thus the power required for changing speed, manually or by a Selsyn motor, may be made independent of the variable resistance of the speeder spring in opposing speed adjustment. The available hydraulic power from the constant pressure source is always more than adequate to overcome the force of the speeder spring at any degree of compression thereof. Thus the power head is useful: (a) in preventing lag on part of (e. g.) a Selsyn motor due to resistance by the speeder spring, and (b) in preventing the speeder spring from disturbing manually adjusted speed setting.

*Power head operating mechanism*

For operating the power head valve stem 93 there is provided, as shown in Figs. 1 and 2, a bell crank 100 pivotally supported on a horizontal shaft 101 in the speeder case. The bell crank has a horizontal extending bifurcated arm 102 provided with a pin and slot connection 103 with the upper end of the valve stem. An upstanding arm 104 of the bell crank has a compressible link connection including a spring 105 and slotted bar 106 with an arm 107, which latter is keyed to a speed adjustment shaft 108 suitably mounted in the speeder case parallel to the shaft 101 and at the right thereof (Figs. 1 and 2). One end of the shaft 108 (or both ends if desired) can extend out of the case for connection with a primary adjustment device or mechanism. One end of the shaft 108 (lower part of Fig. 2) is shown as serrated for engagement with an operating arm (not shown.) The right hand end of the bar 106 is pivotally pinned to the arm 107 at 109, and the slotted end slidably embraces a pin 111 which is vertically adjustable along the upstanding arm 104 of the bell crank 100. By reason of the pin and slot connection at 111 between the arm 100 and the bar 106 the angular motion of the power head operating arm 102 is infinitely variable, within the limits of the slot, with respect to the angular motion of the shaft 108. An operating arm on the shaft 108 could thereby be given the same angle of movement from lowest speed to highest speed notwithstanding the fact that in different settings of the pin 111 in its slot greater or less speed range would be possible. To increase the range the pin 111 is moved toward the shaft 101.

For increased speed adjustment the shaft 108 is rotated counterclockwise as viewed in Fig. 1. At the start of governor operation the power head valve is usually oil locked against downward operation; and because of the compressible link connection constituted by the spring 105 and slotted bar 106, the shaft 108 upon increased speed adjustment cannot be moved (e. g. manually) so forcibly as to strain or break any part of the adjustment mechanism.

SPEED DROOP ADJUSTMENT

Speed droop operation of the governor is accomplished by gradually reducing the downward force of the speeder spring on the pilot valve as the load on the engine is increased and the servo-motor piston 22 operates through the rod 40 in the proper direction to increase power input to the engine (upwardly as herein shown). This is accomplished by operating on the right hand end of the speed adjusting lever 80, hereinafter usually referred to as the power lever. The result of reduction of downward pressure on the speeder spring by the power lever incident to such operation of the servo-motor is to facilitate the operation of the fly-balls in returning the pilot valve toward normal position following increase in load. Thereby the speed of the engine is not returned to normal (as in isochronous operation of the governor) but is depressed an amount determined by the slacking off of effective speeder spring pressure, just as though the speed setting were altered slightly by the speed adjustment mechanism 85—108 upon application of load to the engine.

Located above the right hand end of the power lever 80 is a horizontal cross shaft 120 carried as on aligned pivot bolts or pins 121 in the speeder case which enter respective ends of the shaft as suggested in Fig. 2. The shaft has an enlarged eccentric cylindrical portion 122 (displaced to the right of the shaft center as shown). A ring 123 (speed droop eccentric) embraces the eccentric 121 and in one position of the ring (Fig. 4) a cylindrical outer surface 124 thereof is concentric with the shaft; that is, the eccentricity of the ring surface 124 relative to the eccentric 122 offsets the eccentricity of the latter relative to the axis of the shaft 120. The ring 123, as shown in Fig. 2, can be locked accurately in various positions on the eccentric 122, notwithstanding adequate clearance between the contacting cylindrical surfaces, by a lock nut 125 (speed droop lock nut) threaded to the shaft 120 and having a conical surface portion 126, bearing on a complementary surface of the eccentric ring 123, and a conical surface 127 of the ring, bearing on a further enlarged conical surface portion of the shaft 120. Beyond the last mentioned conical surface, the shaft is further enlarged to provide a toothed wheel or pinion 128 concentric with the shaft axis and meshing with rack teeth 129 on a vertically slidable rod 130 mounted in the speeder case and power cylinder block. The rod 130 constitutes, in effect a tail rod for the servo-motor piston 22, being held in contact with the top face of the trunk portion 39 of the piston 22 by a spring 131 arranged to bear downwardly on the rod 130. An annular strap 135, (eccentric strap), having relatively concentric inner and outer surfaces, rides the outer surface of the speed droop eccentric 123 and is held in position thereon between a flange portion 134 of said eccentric 123 and the adjacent face of the pinion. The flange 134 can be knurled to facilitate turning of the eccentric 123, for speed droop adjustment, and the adjustment can be limited by a pin and slot connection between the eccentric 123 and the pinion. As shown a pin 136 projects horizontally from the eccentric into an arcuate slot 137 in the pinion, which slot is concentric with the eccentric portion 122 of the shaft 120. In the position of the pin 136 indicated in Fig. 4 the eccentric mechanism is set for zero speed droop, since the outer surface of the strap 135 is concentric with the shaft 120 and turning of the latter cannot affect the position of the right hand end of the power lever 80. Thus far the mechanism discussed under "Speed droop adjustment" is substantially the same as the arrangement shown in my copending application identified above but the eccentric strap corresponding to part 135 hereof was pivotally attached to the power lever.

In the present arrangement the eccentric strap 135 operates, in conjunction with suitable spring means to hold the right hand end of the power lever in the desired position vertically of the speeder case through a follower lever 140 pivoted to one side of the speeder case 4 as on a pin 141, said follower lever having a planar top surface in contact with the strap to the left of the pivot pin. The follower lever has a leaf spring 142 bearing to the left on the eccentric strap 135, tending always to hold the follower lever in contact with the strap. The power lever has a pin and slot connection with the follower lever, described below, so that the effective pivot of the power lever is determined principally in accordance with the position of the follower lever.

If desired, in order that the peripheral surfaces of the eccentric strap 135 and the flange 134 of the speed droop eccentric may be marked with a suitable pointer and graduations indicating the amount of speed droop adjustment in a suitable way the strap can be kept from turning as by the device 139, partly attached to the speeder case.

Speed droop operation of the governor will be readily understood if it is borne in mind that, in any possible set position of the eccentric ring 123, except that shown in Fig. 4, increased power input operation of the servo-motor piston 22 will, through the tail rod rack of the servo-motor, operate on the speed droop eccentric mechanism to cause a gradual slacking off of the speeder spring by raising the right hand end of the power lever 80 substantially in proportion to the amount of upward movement of the servo-motor in causing acceleration i. e. increased power input to the governed engine.

The relative upward travel of the rack 129 and the lowering of the right hand end of the power lever 80 through the portion of the eccentric strap 135 which makes contact with the follower lever 140, when plotted, is a sine curve the utilized portion of which is nearly a straight line. The slacking off on the speeder spring of each .001" results in a nearly proportional reduction in speed of the engine. Therefore, at any given speed setting of the governor the speed droop from no load to a given full load will always be the same percentage of the original or normal speed.

CONTINUOUS RECALIBRATION OF SPEED DROOP

In order that the amount of speed droop will be, for example, the same percentage of normal speed at considerably different speed settings of the governor it is necessary properly to modify the action of the speed droop obtaining mechanism such as described above, whenever a different speed setting is chosen. The mechanism described below is for the purpose of recalibrating the speed droop percentage to preserve the same effective speed droop at all speed settings as of the shaft 108.

The follower lever 140 (see Figs. 3 and 4) is bifurcated to provide, in effect, a parallel sided generally horizontal slot 143 extending to the left of the pivot pin 141. The power lever, adjacent the speed droop eccentric, is similarly bifurcated, to the right of the power lever generally, to provide slots 144. The two levers are connected by a common pivot pin 145 which slides horizontally in the slots of the two levers. If the pin 145 is shifted to the right from the position in which shown in Fig. 4 (same as Fig. 1) then raising of the follower lever as from its horizontal position by lifting of the eccentric strap will cause a lesser slacking off of the speeder spring than if the eccentric strap were to be raised with the pin 145 in the illustrated position.

For shifting the interconnecting pivot pin 145 to the right as the power lever is raised by the speed adjusting mechanism 85—108 (decreasing speed setting) and to the left as the power lever is lowered (to increased speed setting) a motion-subtracting lever and linkage mechanism is provided which bears a directly proportional relationship to the speed adjusting movement of the power lever, so that the movement of the pivot pin toward and away from the follower lever pivot is, linearly, always in the same proportion to the movement imparted to the upper end of the speeder spring by the power lever. Raising of the power lever and the consequent shifting of the pivot pin 145 to the right, toward the follower lever pivot, results in a diminution of the amount of slacking off of pressure on the speeder spring incident to upward movement of the servo-motor piston 22, raising of the rack 130, and turning of the eccentric mechanism in the direction to raise the right hand end of the power lever.

As shown, the motion subtracting or normal-speed-droop-diminishing mechanism comprises a bell crank 150 one arm 151 of which is adjustably connected, as by a link 152, to the power lever at the left of the connection of said power lever with the speeder spring 51, and the other arm 153 of which is connected to the pivot pin 145 as by a link 154. The bell crank 150 may be pivoted freely on the cross shaft 101 which carries the bell crank 100 so that motion of the two bell cranks is independent. The right hand end of the link 154 is threaded to block 155 and the latter carries the pivot pin 145 which interconnects the power lever and follower lever. Thereby the pin 145 is shifted to the right as the power head 85 raises the left hand end of the power lever and vice versa. The ratio of movement may be adjusted, if necessary, by a pin and slot connection 157 between the bell crank arm 151 and the link 152; and the position of the pivot-pin-carrying block 155 may also be adjusted, so as to change the effective length of the follower lever with reference to the eccentric mechanism and power lever by virtue of the threaded connection between the link 154 and block 155. The mechanism 140—155 operates, as heretofore outlined, gradually to reduce slacking off of speeder spring pressure, incident to speed droop, as a function of clockwise or speed decreasing movement of the speed adjusting or power lever 80.

In Fig. 5 the speed droop eccentric 123 has been turned 45° counterclockwise as evidenced by the relation of the pin 136 to the ends of the slot 137. Initially this depresses the follower lever 140 about the pivot center 141 and thereby the right hand end of the power lever, so that to set the governor for a particular speed the movement of the power head would vary from that effected in the zero speed droop setting, as will be obvious. As the tail rod rack 129 of the regulating servo-motor piston 22 is raised, during acceleration, the crank action of the eccentric mechanism is to raise the follower lever 140, that is to allow the lever 140 to be swung clockwise about its pivot into a raised position.

Automatic recalibration of speed droop percentage at different speed settings can also be accomplished with the arrangement according to Fig. 6 described below. The lever lengths are distorted for illustrative purposes, i. e. not drawn to scale.

In Fig. 6, the shaft 160 is adjustable to change speeds, as by a Selsyn motor through a gear segment and pinion indicated at 161 and 162 respectively, drivingly connected to the shaft. The shaft is turned clockwise to increase speed and carries an arm 163 journaled in the speeder case, which, ordinarily, would be pivotally connected to the speeder plug 83 of the speeder spring (not shown, but arranged substantially as previously described). Pivotally supported on the arm 163, to the right of the speeder plug, is a lever 165, the supporting pivot of which is indicated at 166. The lever 165 is connected with the speeder plug (e. g. pivotally) so as to tend to depress it if the arms 163 and 165 are turned clockwise as a unit, assuming suitable reactance means to prevent independent clockwise rotation of the lever 165.

Coaxially of the shaft 160 is a free rockshaft 168 to which, as beyond one end of shaft 160, a depending arm 169 is connected. The shaft 160 has, drivingly rigid therewith, an arm 170 extending generally horizontally opposite the direction of extent of the arm 163 of said shaft. The arm 170 is connected, as by a link 171, to an arm 172, one end of which latter arm is pivoted to the regulating rod 40 of the servo-motor piston 22. The arm 172 extends generally parallel to the regulating rod and is moved bodily lengthwise as regulation is effected. The arm 169 has an operating connection with the arm 172 (e. g. short slot 173 so as not to bind) such that as the longitudinal movements of the regulating rod take place the rockshaft 168 is rocked to and fro.

The rockshaft 168 has a short arm 174, overreaching the arm 163 and free therefrom, positioned to contact with and depress an arm 175 rigid with the lever 165 which, as stated above is pivoted to the arm 163 of the speed adjusting shaft outwardly of the speeder plug, the point of contact between 174 and 175 being between the axis of the speeder spring and the pivot axis of the arm 163.

As indicated by arrows on the drawings, movement of the speed adjustment shaft 160 and its arm 163 clockwise sets the governor for higher speed; counterclockwise lower speed. The rod 40 of the servo-motor moves to the right for acceleration of the engine; left for deceleration. In the initial position of the regulating rod 40 (low power input position as to the engine) the arm 169 will have been turned by the arm 172 through the slotted connection 173 therewith until the arm 174 of the rockshaft makes contact with the arm 175 of the lever 165, thereby holding the latter against upward i. e. clockwise movement, preserving a certain amount of downward pressure on the speeder spring.

As the shaft 160 is turned clockwise to adjust the speed setting to the desired point, the arm 170 of the shaft 160 raises the arm 172 and shortens the effective length of the arm 169. Thus as the regulating rod moves to the right, during acceleration, the short arm 174 on the rockshaft 168 lifts and permits the shorter arm of the lever 165 to slack off on the speeder spring to effect a predetermined percentage of speed droop. But at a lower speed setting the arm 172 will not have been raised so high along the arm 169 and therefore the same amount of movement of the regulating rod would not then slack off quite so much on the speeder spring. Thus at lower speed settings, while the subtracting movement of the lever system 169, 174, 175 in respect to the setting of the speeder spring adjustment would be as much in distance units as at any other speed settings nevertheless, with the proper lever arm ratios, the percentage of speed droop would be approximately the same as in such other speed settings.

Speed droop percentage adjustment can be secured with the arrangement according to Fig. 6 in a variety of different ways; for instance by changing the relative effective lengths of the arms 170 and 172. As shown, each arm has a series of holes (177 in arm 170 and 178 in arm 172) at any one of which the link 171 can be pivotally connected. Thus, lengthening or shortening of the arm 172 relative to the arm 170 will modify the speed droop percentage at a given running speed of an engine.

The device described above is shown in simplified form for illustrative purposes. If extremely accurate recalibration for all speed settings were desired a geometrical progression cam mechanism, or its equivalent, could be substituted in place of the link and lever connection between the lever arms 170 and 172.

AUTOMATIC SHUTDOWN

Fig. 1 shows a mechanically acting arrangement by which the speed adjusting shaft 108 can be caused to effect complete shutdown of a Diesel engine regulated by the governor in event release of all pressure on the speeder spring is insufficient to accomplish this. The shaft 108 as shown in Fig. 1 has an arm 180 extending substantially horizontally therefrom into overhanging relation to the speeder plug element 83. Assuming the plug element 83 is a sleeve, a flexible chain 181 (e. g. bead chain) may extend from the arm 180 down through the plug element and speeder spring and have a swivel connection 182 at its lower end with the pilot valve plunger as inside the hollow nut 183 which clamps the inner race member of the bearing 57 to the thrust plate 55. The lower end portion of the chain turns freely in the hollow nut so that the chain will not be twisted and broken. Complete shutdown is accomplished when the shaft 108 is rotated clockwise to such extent as to cause the chain to raise the pilot valve plunger 20 against the speeder spring pressure, thereby dumping all the operating fluid from the lower end of the regulating servo-motor cylinder by valving action of the valve plunger 20 already described.

Instead of the flexible link between the arm 180 and the pilot valve plunger, a rod such as shown at 185, Fig. 5, could be used instead. The rod would have a swivel joint, at least at one of its ends. Provision for longitudinal adjustment of the link may comprise threaded nuts as at 186 (Fig. 5) at the upper end of the rod 185. The rod should have a lost motion connection, either with the arm 180 or with the connector 183 so that speed adjustment through the entire desired range could be accomplished without lifting the pilot valve plunger from its normal position shown in Fig. 1.

The mechanism described below is claimed in my Patent 2,299,824 filed as a division hereof and issued October 27, 1942.

SERVO-CHECK

The servo-check, as previously stated, prevents the operation of the regulating servo-motor piston 22 and its regulating rod in power input increasing direction from being too rapid at critical ranges of operation of the governed engine. The device however allows the servo-motor and regulating rod to move rapidly in said direction an adjustable distance and then damps or checks the remaining travel in that direction. There is no damping in the power input decreasing direction.

The servo-check mechanism (Figs. 2 and 7) comprises, in part, a hollow body 190 mounted on the upper side of the servo-motor block 3 within the speeder case 4 in convenient position for communication with the space 191 above the trunk portion 39 of the servo motor piston. As shown the body 190 is secured to the block as by suitable screws. A chamber 193 on the under side of the body 190 communicates with the servo-motor space 191 through a suitable duct 194 in the servo-motor block. The hydraulic space 191 has its main exit through said duct 194; but fluid is supplied to said space through a check valve 195 shown at the right of the hollow compensating piston 71 in Fig. 1. Fluid from the sump space of the speeder case moves freely past the check valve 195 into the space 191 when the servo-motor piston lowers; wherefore there is never any restraint on the speed decreasing movement of the servo-motor.

Inside the body 190, at the left Fig. 7, is a relatively large vertical bore 197 in open communication with the chamber 193 at the lower end of said bore. The upper end of the bore has air vents 198. A cup shaped plunger 199 slidably seals the bore 197 so as to block the exit of hydraulic fluid through the bore from the chamber 193, the plunger being biased downwardly by a light coil spring 200 reacting upwardly against an upper wall 201 of the body. An abutment screw 202 threaded in said wall 201 is arranged adjustably to limit upward movement of the plunger by engagement therewith as will be obvious. Communicating with the chamber 193 is a restricted outlet orifice 203 to the sump space of the speeder case for hydraulic fluid from the space 191 above the servo-motor piston. The outlet orifice may be adjustable by reason of a needle valve pin 204 aligned with the orifice and threaded into the body 190 at 205. Fluid escapes from the body past the needle valve at a suitable lateral passage 206 in the body 190 beside the reduced tapered lower end of the needle valve pin.

In operation, as the servo-motor moves from its lowered (shut down) position, fluid is forced through the duct 194 raising the plunger 199 from the position shown into a raised position in which the plunger abuts the screw 202. The screw is set, for example, so as to abut the plunger at substantially idling throttle position, and thereupon further upward motion of the servo-motor piston is retarded in accordance with the amount of restriction set by the needle valve 205. Thus even though the operator habitually moves the speeder mechanism rapidly from low to high speed setting the engine will always accelerate at an adjusted rate appropriate to long life on part of the engine. The check valve 195 allows unrestricted rate of throttle closure or fuel reduction.

During ordinary governor operation, because it takes a sudden upward surge of hydraulic fluid through the check valve 195 in order to close said valve, the servo-check mechanism does not operate unless the rate of increase of fuel exceeds predetermined limits. Such limits may be varied by increasing or decreasing (e. g.) the weight of the ball in the check valve 195 or changing the character of the outlet passages around the ball.

Attention in called to my prior application Ser. No. 385,228 filed March 26, 1941, in which certain of the matter claimed herein was originally claimed.

I claim:

1. In combination with a normally isochronous speed governor having adjustable speed setting means and other means operative to adjust a part of the speed setting means to obtain a desired percentage of speed droop on part of the machine to be governed during operation of the governer at one speed setting; of means operated by the speed setting means and operative on said other means to maintain substantially the same percentage of speed droop as the speed setting means is adjusted to a different speed setting.

2. In a speed governor, speed responsive control means including a speeder spring and speed regulating means actuated by the control means, speed setting means acting on the spring to change speed, an adjustable speed droop control means operatively connected with the regulating means in a manner to modify the speed setting in accordance with certain positions of the regulating means, and means operatively connected with the speed setting means and acting on the speed droop control means in such manner as, in effect, to modify automatically the adjustment thereof different amounts with different speed settings respectively.

3. A speed governor wherein regulation is effected by a hydraulic relay including a servo-motor and a plunger type pilot valve to control a servo-motor, speed responsive mechanism including a speeder spring connected to a plunger element of the pilot valve, mechanism operated by the servo-motor and acting on the speeder spring to cause a certain speed droop operation of the governed machine under load, speed setting mechanism acting on the pilot valve through said spring, and mechanism connecting the servo-motor-operated mechanism and speed setting mechanism in a manner progressively to modify the percentage of speed droop as the speed setting mechanism is adjusted from low to high speed settings.

4. In a governor, speed control means, a speed adjusting lever acting on said means and means to swing the lever for primary speed adjustment, a speed regulator controlled by the speed control means for acceleration and deceleration of a governed machine, mechanism connected with the regulator and bearing on a portion of the lever in a manner tending gradually to counteract effective movement of the lever by the second mentioned means consequent upon accelerating operation of the regulator, and variably acting lever mechanism connecting the first mentioned lever and the first mechanism in a manner to modify said action of the regulator on said lever in accordance with the motion imparted to the lever by the primary adjustment effecting means.

5. In a governor, speed control means, a speed adjusting lever acting on the control means, a speed regulator controlled by the speed control means for acceleration and deceleration of a governed machine, said regulator having a part moved transversely of a portion of the lever, a supplemental lever on a fixed pivot, mechanism arranged to cause said part to swing the supplemental lever in a plane parallel to the movement of the speed adjusting lever, a pin connecting said portion of the latter lever with the supplemental lever and shiftable with reference to said portion and the supplemental lever as a variable fulcrum for the speed adjusting lever, and means connected to the fulcrum pin and actuated by speed adjusting swinging movement of the speed adjusting lever to shift the fulcrum pin toward and way from said fixed pivot.

6. A governor according to claim 5, wherein the mechanism which connects said part of the regulator with the supplemental lever is a bodily rotatable differential eccentric mechanism turned by said part and against one element of which eccentric mechanism the supplemental lever acts as a follower, and the eccentric mechanism is adjustable so that it has no action on the follower, in one adjusted condition of the eccentric mechanism, during regulating movements of the regulator.

7. A governor according to claim 5, wherein the means for shifting the fulcrum pin comprises a bell crank pivoted at right angles to the plane of swinging movement of the speed adjusting lever and having arms linked to the latter lever and to the fulcrum pin respectively, and a part of the linkage is adjustable to vary the ratio between the swinging movement of the speed adjusting lever and that of the bell crank.

8. A governor according to claim 5 wherein the means for shifting the fulcrum pin includes a link adjustably connected with the pin and movable lengthwise of the supplemental lever for initial adjustment of the location of the variable fulcrum.

9. A governor according to claim 5 wherein the speed adjusting lever is pivoted intermediately of its ends to a speeder spring constituting a part of the speed control means, said mechanism includes a rotatably mounted differential eccentric in geared relation to the regulator and capable of adjustment for zero speed droop and various percentages of speed droop action on the supplemental lever and thereby on the speed adjusting lever and the end of the lever opposite the variable fulcrum has a fixed pivot in a power operated elevating device for changing speed setting.

10. In a speed governor, a regulator part adapted to be moved in opposite directions for acceleration and deceleration of a governed machine, a speed setting lever rockable about a fulcrum axis to adjust the speed at which the governed machine is to operate normally, a supplemental lever pivoted to the speed adjusting lever remotely of its fulcrum axis and extending toward said fulcrum axis and adapted for connection to a speed changing element of the governor such as a speeder spring, a rock shaft coaxial with the speed adjusting lever, an arm on the rockshaft adapted to bear on a portion of the supplemental lever in a manner tending to turn it about its pivot toward such speed changing element, another arm on the rockshaft, a member extending transversely of said other arm and parallel to the movement of the regulator part and connected therewith so that movement of the regulator part shifts the member lengthwise, a shiftable connection between said other arm of the rockshaft and said member operable to impart rocking movement to the rockshaft and means operatively connected to the speed setting lever and said member for causing a speed setting movement to shift the connection between said other arm of the rockshaft and said member in a manner to increase and decrease the swing of the rockshaft incident to a fixed movement of the regulator part.

11. In a speed governor, speed weighing mechanism including a speed responsive element and speeder spring and means controlled jointly by said element and spring to effect regulation, a speeder case, an arm in the speeder case extending over the spring and connected thereto, a fulcrum in the speeder case for the arm, a hydraulic power head cylinder in the speeder case, a power head piston in the cylinder having a hollow stem pivotally connected with the arm, and a reversing valve for the piston coaxially thereof and having an operating stem extending through the hollow piston stem for operation to adjust the speed setting of the governor through the intermediary of the power head.

12. In a speed governor a centrifugally operable speed weighing mechanism including a speeder spring, a hydraulically operated speed adjusting mechanism operatively connected to the spring in a manner to increase and decrease its effective force for changing speed, an actuator valve for said hydraulically operated mechanism, which valve is subject to becoming hydraulically restrained from rapid movement in one direction, a speed setting element, and an operating connection between said element and the actuator valve which connection is yielding when moved in a manner tending to operate the actuator valve in said direction.

13. In a governor having a weighing mechanism including a spring, a reversible hydraulic power head having a hydraulically actuated plunger operatively connected to the spring for varying its effective force, means to supply hydraulic fluid to the power head, said means including an actuating valve plunger member on the power head concentric with the plunger thereof and operable to cause the power head plunger to move in opposite directions in direct proportion to movement of the valve member, an adjusting element, and a yielding operating connection between the said adjusting element and the power-head-actuating valve plunger member.

14. In a speed governor, mechanism for regulating speed, a speed weighing mechanism operatively associated with the regulating mechanism and including a speeder spring, means controlled by the weighing mechanism to actuate the regulating mechanism, a speed adjusting element operatively connected to the spring to change speed setting, a shaft operatively connected to the regulating mechanism and turned thereby in a predetermined direction consequent upon regulating operations thereof, and a speed droop adjusting means comprising a differential eccentric device on the shaft and operatively connected to the adjusting element, said eccentric device being adjustable into a position relative to the shaft so that turning of the shaft does not move the adjusting element and into other positions wherein turning movement of the shaft moves the element.

15. A speed droop adjusting means according to claim 14, comprising a circular eccentric in fixed relation to the shaft, a ring having a circular surface concentric with the shaft and another surface complementary to the circular eccentric and embracing the latter, means connecting the speed adjusting element to the ring at its circular surface and means for locking the ring in different positions on the eccentric.

16. In a normally isochronous speed governor, speed control means, speed regulating means, speed setting means operatively connected to the speed control means and settable to obtain different speeds, adjustable mechanism for causing the governor to operate non-isochronously to effect a desired percentage of speed droop at one speed, said mechanism operating on the speed control means as a function of speed regulation, and speed droop modifying means acting on said adjustable mechanism as a function of setting of the speed setting means to obtain other speeds.

17. In a normally isochronous speed governor, speed control means, speed regulating means, speed setting means operatively connected to the speed control means and settable to obtain different speeds, adjustable mechanism for causing the governor to operate non-isochronously to effect a desired percentage of speed droop at one speed, said mechanism operating on the speed control means as a function of speed regulation, and speed droop modifying means acting on said adjustable mechanism as a function of setting of the speed setting means to obtain other speeds.

18. In a governor, a hydraulic relay including a regulating servo-motor and reciprocably movable pilot valve, weighing mechanism for operating the valve, said mechanism including a spring connected to the valve, an adjusting lever operatively connected to the spring at one point along the lever for varying the effective force of the spring, a hydraulic power head and operating valve means therefor, said power head being connected to the lever at another point therealong for adjusting the lever and thereby the spring initially to set the governor, and means operatively connecting a movable element of the servo-motor to the lever at a third point therealong for additionally adjusting the lever and spring automatically in accordance with predetermined regulating movements of the servo-motor.

19. In a governor, a hydraulic relay including a regulating servo-motor and reciprocably movable pilot valve, weighing mechanism including a spring connected to the valve for operating the valve to control the servo-motor, an adjusting lever operatively connected to the spring intermediately of the ends of the lever for varying the effective force of the spring, a hydraulic power head plunger and operating valve means therefor, said lever being pivotally connected to the plunger at a point spaced from the aforesaid connection toward one end of the lever for adjusting the spring initially to set the governor, and means operatively connecting a movable element of the servo-motor to the lever at a point spaced from the first mentioned connection toward the opposite end of the lever for additionally adjusting the spring automatically about said pivotal connection in accordance with predetermined regulating movements of the servo-motor.

20. In a speed governor, a hydraulic relay including a speed regulating servo-motor and actuating pilot valve therefor, speed weighing means including a speeder spring operatively connected to the pilot valve, a spring adjusting lever connected intermediately of its ends to the spring, a hydraulic power head pivotally connected to one end portion of the lever, control valve means for the power head for initially setting the spring through the intermediary of the lever, means constituting a movable fulcrum for the other end portion of the lever, and means operatively connecting the servo-motor to the fulcrum-constituting means in a manner automatically to modify the speeder spring setting in accordance with regulating movement of the servo-motor.

21. In a normally isochronous hydraulic relay governor comprising adjustable speeder mechanism including speed responsive means connected with relatively sliding telescoping pilot valve elements arranged to control a hydraulic regulating servo-motor, said governor having a servo-motor-actuated compensation system including a receiving compensation piston and co-acting cylinder, one operatively connected to the pilot valve compensatingly to bias the same during speed change; the combination of means arranged to maintain continuous relative rotation between the pilot valve elements and between the compensating piston and cylinder during operation of the governor for rendering the governor sensitive to small speed changes, and means operatively connecting the servo-motor and speeder mechanism, said last named means being adjustable from an idle position to an active position which latter will cause non-isochronous operation of the governor.

ALBERT KALIN.